(12) United States Patent
Hagimura

(10) Patent No.: US 7,522,533 B2
(45) Date of Patent: Apr. 21, 2009

(54) OPTICAL TRANSMISSION APPARATUS HAVING PATH TRACE FUNCTION

(75) Inventor: Dai Hagimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 429 days.

(21) Appl. No.: 11/084,612

(22) Filed: Mar. 18, 2005

(65) Prior Publication Data

US 2005/0163055 A1  Jul. 28, 2005

Related U.S. Application Data

(63) Continuation of application No. PCT/JP03/00420, filed on Jan. 20, 2003.

(51) Int. Cl.
*G01R 31/08* (2006.01)
(52) U.S. Cl. .............. 370/251; 370/466; 370/395.51
(58) Field of Classification Search ......... 370/248, 370/228, 466, 251, 395.51
See application file for complete search history.

(56) References Cited

U.S. PATENT DOCUMENTS

| | | | | |
|---|---|---|---|---|
| 5,526,349 | A * | 6/1996 | Diaz et al. ............... | 370/392 |
| 5,751,720 | A * | 5/1998 | Uematsu et al. ........... | 370/503 |
| 5,822,299 | A * | 10/1998 | Goodman ................. | 370/228 |
| 5,857,092 | A * | 1/1999 | Nakamura et al. ......... | 710/62 |
| 6,094,440 | A * | 7/2000 | Sugawara et al. .......... | 370/465 |
| 6,226,270 | B1 | 5/2001 | Chiku et al. | |
| 6,246,668 | B1 * | 6/2001 | Kusyk ..................... | 370/228 |
| 6,411,631 | B1 * | 6/2002 | Sugawara et al. .......... | 370/465 |
| 6,426,958 | B1 * | 7/2002 | Crossett et al. ........... | 370/466 |
| 6,603,776 | B1 * | 8/2003 | Fedders et al. ............ | 370/476 |
| 6,658,607 | B1 * | 12/2003 | Michel et al. ............. | 714/712 |
| 6,700,900 | B1 * | 3/2004 | Turban .................... | 370/465 |

(Continued)

FOREIGN PATENT DOCUMENTS

JP  4-14345  1/1992

(Continued)

OTHER PUBLICATIONS

ANSI TI.269-2000. Information Interchange Structure and Representation of Trace Message Formats for the North American Telecommunications System, Alliance for Telecommunications Industry Solutions, American National Standards Institute , Inc. , May 19, 2000. https://www.atis.org/atis/docstore/searchform.asp.

(Continued)

*Primary Examiner*—Ricky Ngo
*Assistant Examiner*—Dewanda Samuel
(74) *Attorney, Agent, or Firm*—Fujitsu Patent Center

(57) ABSTRACT

An optical transmission apparatus has a path trace function of carrying out a conductive state check of a path in a synchronous optical transmission network. The optical transmission apparatus includes a first judgment unit judging a path trace format of an existing standard in accordance with detection of a first specific code contained in path trace data, and a second judgment unit judging a path trace format of a new standard in accordance with detection of a second specific code contained in path trace data. The apparatus further includes a third judgment unit specifying one of the path trace formats of the new standard in accordance with a content of a third specific code contained together with the second specific code in the path trace data.

11 Claims, 11 Drawing Sheets

U.S. PATENT DOCUMENTS

| | | | |
|---|---|---|---|
| 7,062,554 B1 * | 6/2006 | Gallagher et al. | 709/224 |
| 2002/0034259 A1 | 3/2002 | Tada | |
| 2002/0122441 A1 * | 9/2002 | Kawasumi et al. | 370/535 |
| 2005/0174948 A1 * | 8/2005 | Isonuma | 370/241 |

FOREIGN PATENT DOCUMENTS

| | | |
|---|---|---|
| JP | 9-074395 | 3/1997 |
| JP | 11-122241 | 4/1999 |
| JP | 11-261513 | 9/1999 |
| JP | 2000-68985 | 3/2000 |
| JP | 2000-244434 | 9/2000 |
| JP | 2002-101121 | 4/2002 |

OTHER PUBLICATIONS

GR-253 Iss. 03, "Synchronous Optical Network (SONET) Transport Systems: Common Generic Criteria" GR-253-CORE Issue 3 (excerpt), Telcordia Technologies, Sep. 2000 http://telecom-info.telcordia.com/site-cgi/ido/index.html.

Notice of Reason for Rejection dated Feb. 12, 2008, from the corresponding Japanese Application.

* cited by examiner

FIG. 1

| BYTE # | VALUE (BIT 1, 2, ..., 8) | | | | | | | |
|---|---|---|---|---|---|---|---|---|
| 1 | × | × | × | × | × | × | × | × |
| 2 | × | × | × | × | × | × | × | × |
| ⋮ | | | | | | | | |
| 62 | × | × | × | × | × | × | × | × |
| 63 | 0 | 0 | 0 | 0 | 1 | 1 | 0 | 1 |
| 64 | 0 | 0 | 0 | 0 | 1 | 0 | 1 | 0 |

NOTES
1. XXXXXXXX REPRESENTS AN ASCII CHARACTER.
2. BYTE#63 MEANS CARRIGE RETURN (CR) 0Dh.
   BYTE#64 MEANS LINE FEED (LF) 0Ah.

FIG. 3

| BYTE # | VALUE (BIT 1, 2, ..., 8) | | | | | | | |
|---|---|---|---|---|---|---|---|---|
| 1 | 1 | $c_1$ | $c_2$ | $c_3$ | $c_4$ | $c_5$ | $c_6$ | $c_7$ |
| 2 | x | x | x | x | x | x | x | x |
| ⋮ | | | | ⋮ | | | | |
| 16 | x | x | x | x | x | x | x | x |
| 17 | 1 | $c_1$ | $c_2$ | $c_3$ | $c_4$ | $c_5$ | $c_6$ | $c_7$ |
| 18 | x | x | x | x | x | x | x | x |
| ⋮ | | | | ⋮ | | | | |
| 32 | x | x | x | x | x | x | x | x |
| 33 | 1 | $c_1$ | $c_2$ | $c_3$ | $c_4$ | $c_5$ | $c_6$ | $c_7$ |
| 34 | x | x | x | x | x | x | x | x |
| ⋮ | | | | ⋮ | | | | |
| 48 | x | x | x | x | x | x | x | x |
| 49 | 1 | $c_1$ | $c_2$ | $c_3$ | $c_4$ | $c_5$ | $c_6$ | $c_7$ |
| 50 | x | x | x | x | x | x | x | x |
| ⋮ | | | | ⋮ | | | | |
| 64 | x | x | x | x | x | x | x | x |

NOTES
1. $c_1 c_2 c_3 c_4 c_5 c_6 c_7$ IS THE RESULT OF THE CRC-7 CALUCULATION OVER THE PREVIOUS FRAME. $c_0$ IS THE MSB.

2. XXXXXXXX REPRESENTS A T.50 CHARACTER.

FIG. 4

| BYTE # | VALUE (BIT 1, 2, ..., 8) | | | | | | | |
|---|---|---|---|---|---|---|---|---|
| 1 | 1 | $C_1$ | $C_2$ | $C_3$ | $C_4$ | $C_5$ | $C_6$ | $C_7$ |
| 2 | × | × | × | × | × | × | × | × |
| ⋮ | ⋮ | | | | | | | |
| 64 | × | × | × | × | × | × | × | × |

NOTES
1. $C_1 C_2 C_3 C_4 C_5 C_6 C_7$ IS THE RESULT OF THE CRC-7 CALUCULATION OVER THE PREVIOUS FRAME. $C_0$ IS THE MSB.

2. XXXXXXXX REPRESENTS A T.50 CHARACTER.

FIG. 9

| BYTE # | VALUE (BIT 1, 2, ..., 8) | | | | | | | |
|---|---|---|---|---|---|---|---|---|
| 1 | 1 | $c_1$ | $c_2$ | $c_3$ | $c_4$ | $c_5$ | $c_6$ | $c_7$ |
| 2 | × | × | × | × | × | × | × | × |
| ⋮ | | | | | | | | |
| 64 | × | × | × | × | × | × | × | × |

OPTICAL TRANSMISSION APPARATUS HAVING PATH TRACE FUNCTION

CROSS-REFERENCE TO RELATED APPLICATION

This application is a continuation of International Application PCT/JP03/00420, filed on Jan. 20, 2003, the contents of which are herein wholly incorporated by reference.

BACKGROUND OF THE INVENTION

The present invention relates to an optical transmission apparatus or system having a path trace function for performing a conductive state check of a path in a synchronous optical transmission network.

An optical transmission apparatus constituting communication nodes in a synchronous optical transmission network is required to have a path trace function, in which in order to find an erroneous connection of a path (a logical route in a transmission path) caused by a provisioning erroneous setting of a maintainer and the like, a J1 byte (a lead byte) located at a path overhead (POH) of a transfer frame between the communication nodes is used to continuously transmit and receive a path trace message (in this specification, a message included in path trace data (PTD)) and perform a conductive state check of the path.

A SONET (Synchronous Optical Network) based optical transmission apparatus having a conventional path trace function transmits and receives the path trace message through the path desired to be established, in accordance with a path trace format proposed by a GR-253 Issue (Iss.)02 standard.

For this reason, a transmission side optical transmission apparatus transmits the path trace message in accordance with the path trace format. On the other hand, a reception side optical transmission apparatus needs to check that the path is normally established by, after receiving the transmitted path trace message, extracting this message in accordance with the path trace format, and judging whether or not this is the message to be received, This SONET-based optical transmission apparatus transmits and receives the path trace message in the path trace format proposed by the GR-253Iss.02 standard shown in FIG. 1. This path trace format has any path trace message represented by a printable or displayable ASCII (American Standard Code for Information Interchange) character code corresponding to 62 bytes, and the path trace data configuration corresponding to 64 bytes of a carriage return (CR:0Dh) code and a line feed (LF:0Ah) code. In this specification, this path trace format is referred to as a SONET 64-byte format.

As regards a method of detecting the SONET 64-byte format, a method shown in FIG. 2 is proposed in Japanese Patent Laid-Open Publication No. 11-261513 (Path Trace Check Method and Apparatus: Patent Document 1).

With this method, a path overhead (POH) is firstly extracted from a transfer frame, to extract the path trace data (PTD) from a J1 byte of this path overhead. Next, the CR code is detected from the extracted path trace data. It is known that this CR code is defined at a 63-rd byte of the SONET 64-byte format. Thus, if the CR code can be detected, the first byte of the path traced at a exists two bytes backward therefrom. Hence, those corresponding to the 64 bytes can be sequentially extracted from the first byte.

However, in the GR-253Iss.03 standard, an edition of an ANSI (American National Standards Institute) T1.269-2000 standard is additionally noted. The ANSI T1.269-2000 standard proposes the path trace formats shown in FIG. 3 and FIG. 4 to aim at the SONET/SDH (Synchronous Digital Hierarchy) uniformalization of the path trace formats.

The path trace format shown in FIG. 3 has the path trace data configuration corresponding to 16 bytes of: a header byte corresponding to 1 byte; and any path trace message represented by an ITU-T recommendation T.50 character code, namely, a printable or displayable ASCII character code corresponding to 15 bytes.

In this header byte, a frame start marker "1" is inserted into MSB (Most Significant Bit), and a circulation redundancy inspection CRC-7 operation result of a previous frame is inserted into the remaining seven bits. This format is a section trace and path trace format itself in an ITU-T recommendation G.707 (SDH). Here, the format is referred to as a 16-byte frame format.

Also, the path trace format shown in FIG. 4 has the path trace data configuration corresponding to 64 bytes of: a header byte corresponding to 1 byte; and any path trace message represented by the ITU-T recommendation T.50 character code, namely, the printable or displayable ASCII character code corresponding to 63 bytes.

This header byte is provided with the frame start marker and the CRC-7 operation result of the previous frame, similarly to the 16-byte frame format. In this specification, this is referred to as a 64-byte frame format.

As mentioned above, the ANSI T1.269-2000 is proposed in the GR-253Iss.03 standard. Thus, the optical transmission apparatus having the path trace function needs to support the path trace format of the existing standard and the path trace format of the new standard.

However, the conventional optical transmission apparatus, since having a preamble that the SONET 64-byte format is detected, cannot detect the 16-byte frame format and the 64-byte frame format. Thus, this results in a problem in that a function for detecting a new format must be separately added.

Simply, it is assumed to configure the optical transmission apparatus including detection circuits corresponding to the respective path trace formats. However, with this configuration, an increase in the apparatus (circuit) scale cannot be avoided. Thus, there is a room of improvement.

Also, the conventional optical transmission apparatus cannot automatically judge which of the formats is used to transmit and receive the path trace message (path trace data). Thus, this leads to a problem in that the format to be used for the transmission reception of the path trace message between the transmission side and the reception side must be preliminarily set for the optical transmission apparatus by the intervention of the maintainer, and the like.

The following are related arts to the present invention.

[Patent Document 1]
Japanese Patent Laid-Open Publication No. 11-261513

[Patent Document 2]
Japanese Patent Laid-Open Publication No. 11-122241

[Patent Document 3]
Japanese Patent Laid-Open Publication No. 2002-101121

[Non-Patent Document 1]
ANSI T1. 269-2000
Document name: Information Interchange Structure and Representation of Trace Message Formats for the North American Telecommunications System
Publisher: Alliance for Telecommunications Industry Solutions American National Standards Institute, Inc.
Date of issue: May 19, 2000
URL: https://www.atis.org/atis/docstore/searchform.asp

[Non-Patent Document 2]
GR-253 Iss. 03
Document Name: Synchronous Optical Network (SONET) Transport Systems: Common Generic Criteria GR-253-CORE Issue 3
Publisher: Telcordia Technologies
Date of issue: September 2000
URL: http://telecom-info.telcordia.com/site-cgi/ido/index.html

SUMMARY OF THE INVENTION

An object of the present invention is to provide an optical transmission apparatus having a path trace function, which can support a path trace format of a new standard, together with a path trace format of an existing standard.

Another object of the present invention is to provide an optical transmission apparatus that can attain a reduction in an apparatus (circuit) scale by sharing components.

Still another object of the present invention is to provide an optical transmission apparatus that can carry out a conductive state check of a path based on an agreement/disagreement of an original path trace message, without requiring a maintainer to perform any setting with regard to a path trace format.

Still another object of the present invention is to provide an optical transmission apparatus that can carry out a judgment of a path trace format and an agreement/disagreement judgment of a path trace message after stable transmission/reception of a path trace data becomes possible, by setting a protection stage number.

A first aspect of the present invention provides an optical transmission apparatus having a path trace function of carrying out a conductive state check of a path in a synchronous optical transmission network, including:

a first judgment unit judging a path trace format of an existing standard, in response to a detection of a first specific code contained in a path trace data; and a second judgment unit judging a path trace format of a new standard, in response to a detection of a second specific code contained in the path trace data.

A second aspect of the present invention provides the optical transmission apparatus, further including a third judgment unit specifying one of the path trace formats of a plurality of the new standards, in accordance with a content of a third specific code which is contained together with the second specific code in the path trace data.

A third aspect of the present invention provides the optical transmission apparatus, in which when the first judgment unit does not detect the first specific code, the second judgment unit detects the second specific code.

A fourth aspect of the present invention provides the optical transmission apparatus, in which:

when the first judgment unit does not detect the first specific code, the second judgment unit detects the second specific code; and when the second judgment unit detects the second specific code, the third judgment unit detects the third specific code.

A fifth aspect of the present invention provides the optical transmission apparatus, in which:

the first specific code is a carriage return code; and the second specific code is a frame start marker.

A sixth aspect of the present invention provides the optical transmission apparatus, in which:

the first specific code is a carriage return code;

the second specific code is a frame start marker; and the third specific code is an operation result of a circulation redundancy inspection of the path trace data corresponding to 16 bytes or 64 bytes of a previous frame.

A seventh aspect of the present invention provides the optical transmission apparatus, in which the path trace data in the path trace format of the existing standard has a 64-byte configuration of a path trace message represented by a printable or displayable ASCII character code corresponding to 62 bytes, the carriage return code corresponding to one byte, and a line feed code corresponding to one byte; and the path trace data in the path trace format of the new standard has a 16-byte configuration of a header byte corresponding to one byte including the second specific code and a path trace message represented by a printable or displayable ASCII character code corresponding to 15 bytes, or a 64-byte configuration of a header byte corresponding to one byte including the second specific code and a path trace message represented by a printable or displayable ASCII character code corresponding to 63 bytes.

An eighth aspect of the present invention provides the optical transmission apparatus, in which the path trace data in the path trace format of the existing standard has a 64-byte configuration of a path trace message represented by a printable or displayable ASCII character code corresponding to 62 bytes, the carriage return code corresponding to one byte, and a line feed code corresponding to one byte, and the path trace data in the path trace format of the new standard has a 16-byte configuration of a header byte corresponding to one byte including the second specific code and the third specific code and a path trace message represented by a printable or displayable ASCII character code corresponding to 15 bytes, or a 64-byte configuration of a header byte corresponding to one byte including the second specific code and the third specific code and a path trace message represented by a printable or displayable ASCII character code corresponding to 63 bytes.

A ninth aspect of the present invention provides the optical transmission apparatus, further including a holding unit that can hold the path trace data of the path trace format of the existing standard and the path trace format of the new standard.

A tenth aspect of the present invention provides the optical transmission apparatus, in which the second judgment unit and the holding unit are shared to process the path trace data of the path trace format of the existing standard and the path trace format of the new standard.

An eleventh aspect of the present invention provides the optical transmission apparatus, in which the third judgment unit is shared to process the path trace data of the path trace format of the existing standard and the path trace format of the new standard.

A twelfth aspect of the present invention provides the optical transmission apparatus, further including a protection stage number function unit judging a normal reception of the path trace format on the basis of detection results of a plurality of times.

A thirteenth aspect of the present invention provides the optical transmission apparatus, further including a comparing unit comparing a path trace message received from the protection stage number function unit and a path trace message that is preset from a maintainer terminal and held as an expectation value.

A fourteenth aspect of the present invention provides the optical transmission apparatus, further including a unit, when a detection impossible state of the path trace format occurs, notifying a maintainer terminal of the occurrence of the detection impossible state.

A fifteenth aspect of the present invention provides the optical transmission apparatus, further including unit, in accordance with a result of automatic determination of the path, trace format from an opposite station at a time of a two-way transmission route configuration or intermediate path trace execution as the path, automatically selecting the path trace format that can be received and transmitting the path trace data to the opposite station at the time of the two-way transmission route configuration or to a path trace reception station existing at an intermediate position at the time of the intermediate path trace execution.

A sixteenth aspect of the present invention provides the optical transmission apparatus, further including a unit, when a character number of a path trace message of a transmission target set from a maintainer terminal exceeds a character number processed in the path trace format, notifying the maintainer terminal of a character number excess state and a transmittable maximum character number.

A seventeenth aspect of the present invention provides the optical transmission apparatus, further including a unit reporting a judgment result of the path trace format, and a SONET/SDH mode based on an SS bit within an H1 byte of a SONET/SDH frame, to a maintainer terminal.

BRIEF DESCRIPTION OF THE DRAWINGS

FIG. 1 shows a SONET 64-byte format;

FIG. 3 shows a 16-byte frame format;

FIG. 4 shows a 64-byte frame format;

Figure 9:
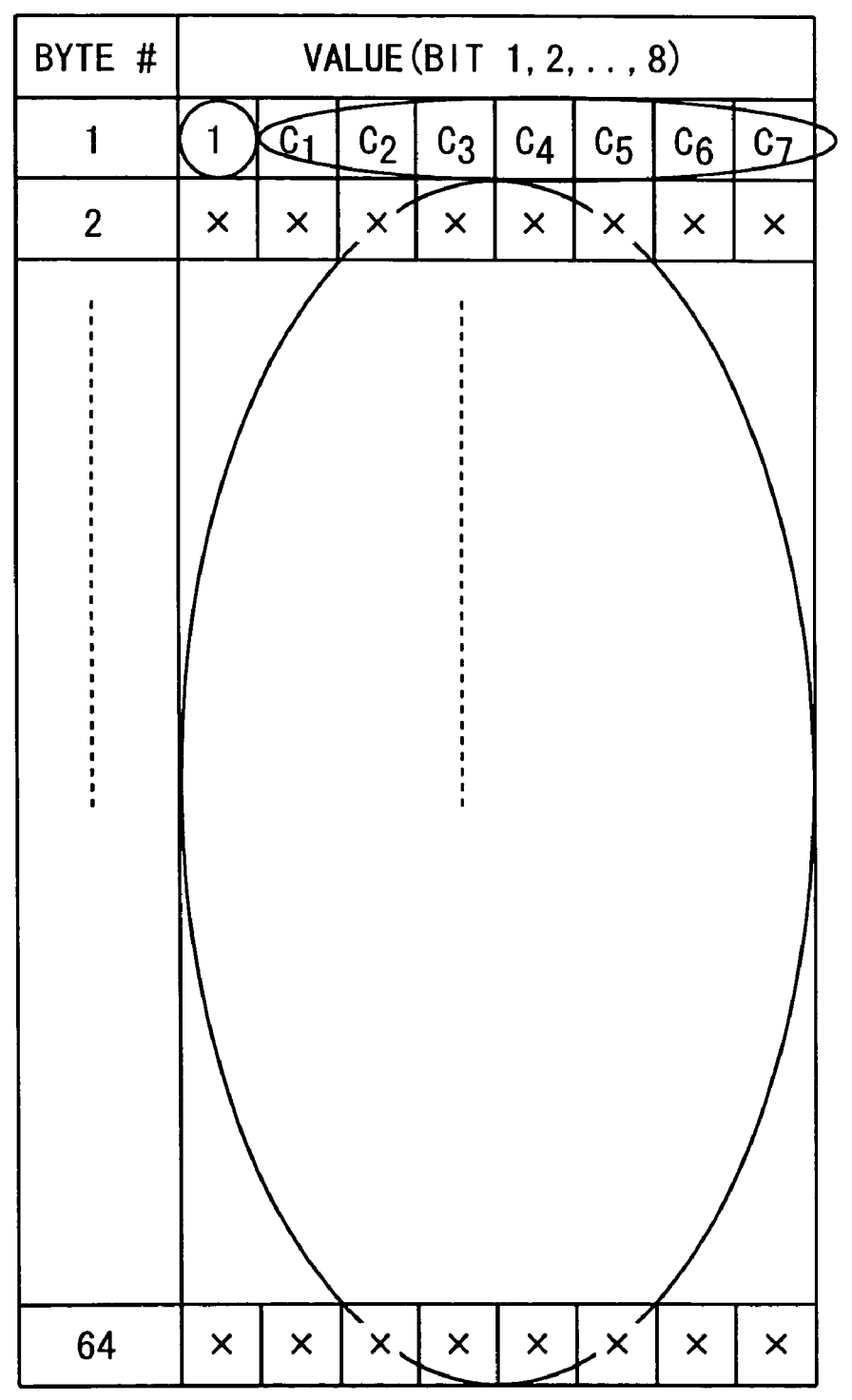

FIG. 9 is a diagram for explaining the operation of the optical transmission apparatus according to the embodiment of the present invention;

DETAILED DESCRIPTION OF THE PREFERRED EMBODIMENTS

[Function of Optical Transmission Apparatus]

An optical transmission apparatus having a path trace function according to an embodiment of the present invention will be described below with reference to FIG. 5 and FIG. 6.

<Reception Side Components of Optical Transmission Apparatus>

Figure 6:
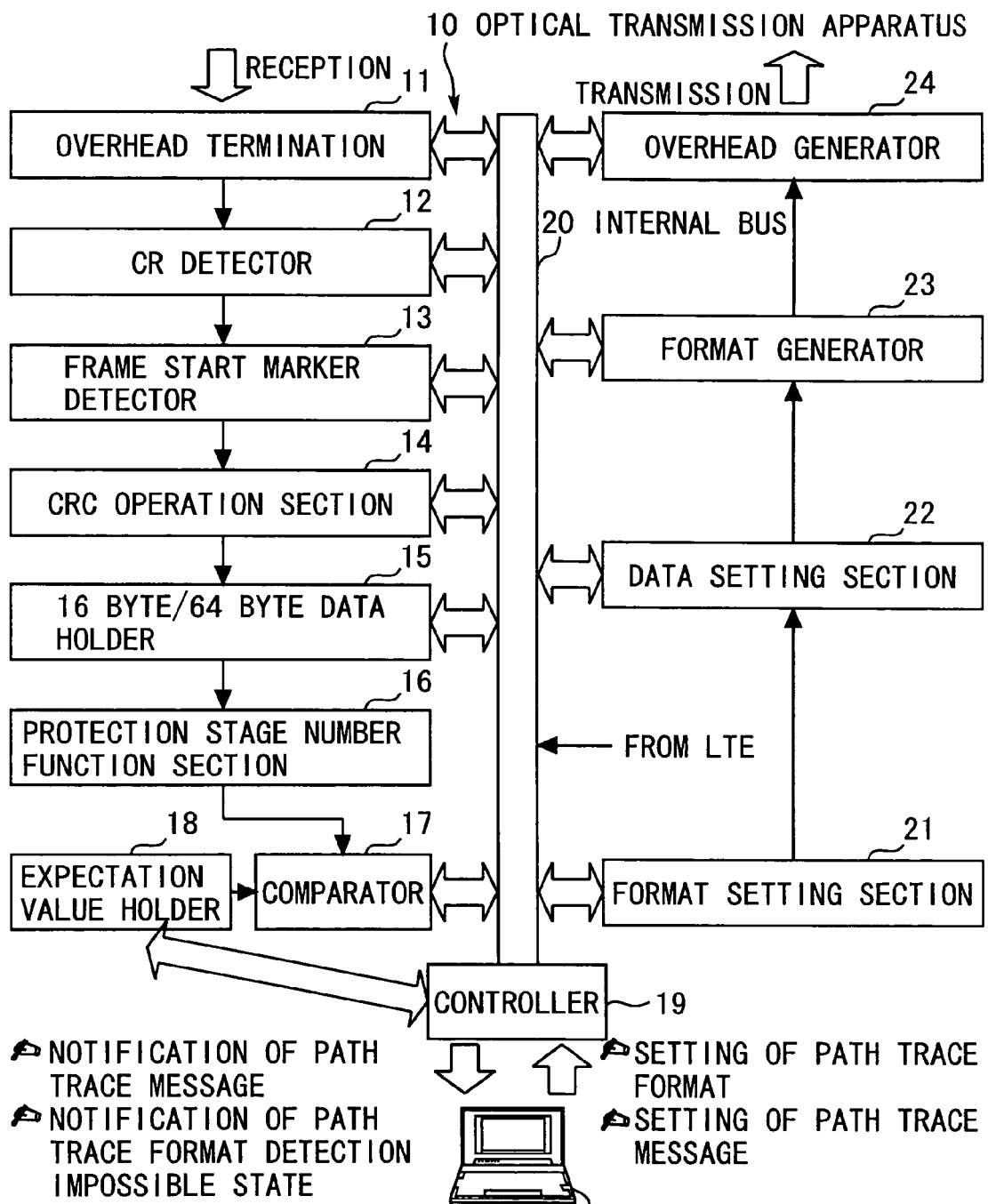
FIG. 6 is a block diagram showing a configuration example of an optical transmission apparatus according to an embodiment of the present invention.

An optical transmission apparatus 10 having a path trace function shown in FIG. 6 includes, as the reception side components to a transmission path in a synchronous optical transmission network (SONET), an overhead termination 11, a carriage return (CR) detector 12, a frame start marker detector 13, a CRC operation section 14, a data holder 15, a protection stage number function section 16, a comparator 17, an expectation value holder 18, and a controller 19.

Here, the overhead termination 11, the CR detector 12, the frame start marker detector 13, the CRC operation section 14, the data holder 15, the comparator 17, and the controller 19 are mutually connected through an internal bus 20.

In detail, the overhead termination 11 as the reception side component terminates a path overhead (POH) in accordance with an STM-1 (Synchronous Transport Module Level-1) frame of 9 rows×270 columns received from the transmission path in the synchronous optical transmission network, namely, each VC-3 (Virtual Container-3) of 9 rows×85 columns included in a payload of a SONET/SDH frame, and extracts a path trace data (PTD) from a J1 byte of a lead position of each path overhead. As for the detail of this STM-1 frame, it is possible to refer to FIG. 3 of Patent Document 2.

The CR detector (a SONET 64-byte format judging section) 12 judges whether or not it is the SONET 64-byte format in accordance with the presence or absence state of a carriage return (CR) code in the path trace data extracted by the overhead termination 11. An ASCII character code section in the path trace format defines an input of a printable or displayable ASCII character code, and a control code is never inputted (stored). Thus, if a CR code is discovered, it can be judged to be the SONET 64-byte format.

The frame start marker detector (16-byte frame format, 64-byte frame format judging section) 13 judges whether or not it is the 16-byte frame format or the 64-byte frame format in accordance with the presence or absence state of the frame start marker in the path trace format. The MSB of the printable or displayable ASCII character code is "0", and the MSB of the CR code and the line feed (LF) code are also "0". Thus, it can be judged to be the 16-byte frame format or the 64-byte frame format in accordance with the presence or absence of the frame start marker (MSB=1).

The CRC operation section (a 16-byte frame format/64-byte frame format judging section) 14 detects whether the range in agreement with a circulation redundancy inspection CRC-7 operation result is 16 bytes or 64 bytes, and consequently judges the 16-byte frame format or the 64-byte frame format. In short, since the CRC-7 operation result of the received path trace data is stored in a header byte of a next frame, the operation result in the 16-byte range and the operation result in the 64-byte range are compared, which consequently enables the judgment between the 16-byte frame format and the 64-byte frame format.

The data holder 15 can hold the path trace data corresponding to the 16 bytes or 64 bytes from the lead byte.

The protection stage number function section 16 detects the path trace format by providing a protection stage number, in which at a time of path trace format reception, for example, after the reception of continuous two times, if the normal format can be detected in both of them, the format is judged to be normally received, or after the reception of continuous five times, the normal format cannot be received in all of the five times, the format is judged not to be normally detected. Due to this protection stage number function section 16, after the reception path trace data is stable, the determination of the path trace format and the agreement/disagreement judgment of the path trace message can be performed, which can protect the variation (fluctuation) in the detection result.

The expectation value holder 18 receives a path trace message, which a maintainer presets from a maintainer terminal 30, from the controller 19 and holds. The comparator 17 compares the path trace message received from the protection stage number function section 16 and the path trace message that is preset by the maintainer and held in the expectation value holder 18.

The controller 19 has a format judgment function for finally judging the path trace format in accordance with the judgment results of the respective sections, and has respective functions that will be described later.

This optical transmission apparatus 10 can automatically determine the kind of the received path trace format due to the jointing action between those reception side components.

Figure 2:
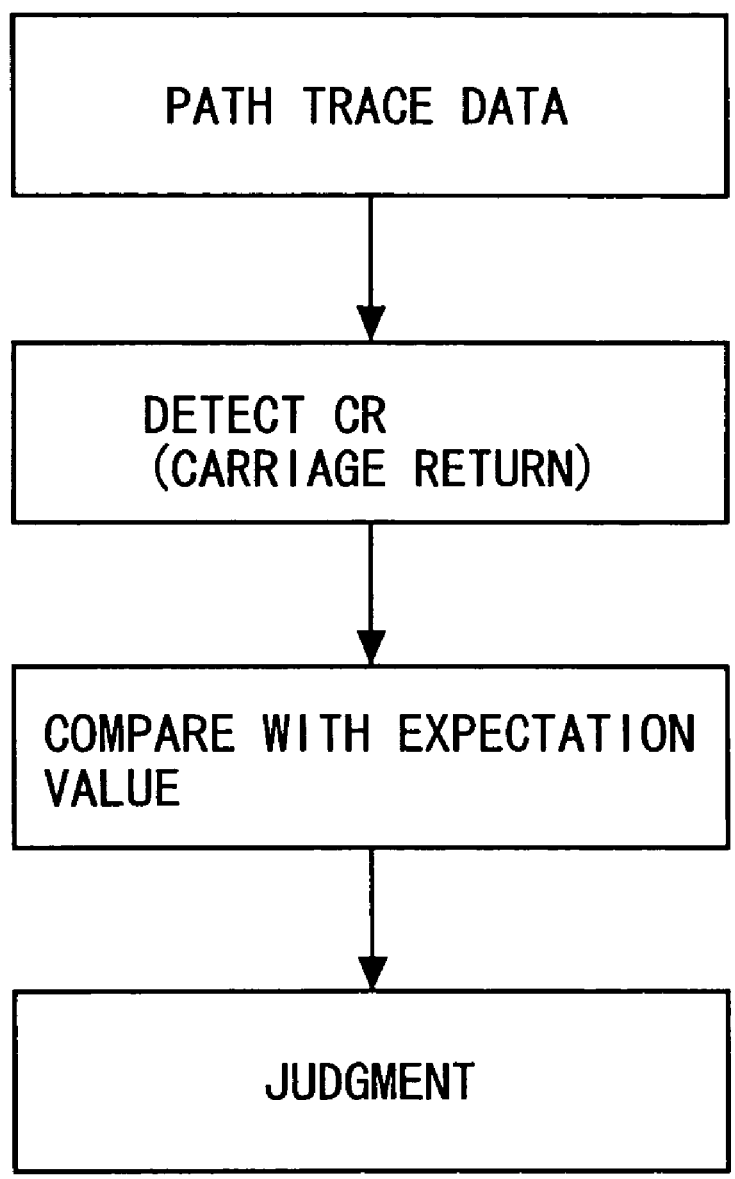
FIG. 2 is a diagram for explaining a detecting method of a conventional SONET 64-byte format.
Figure 5:
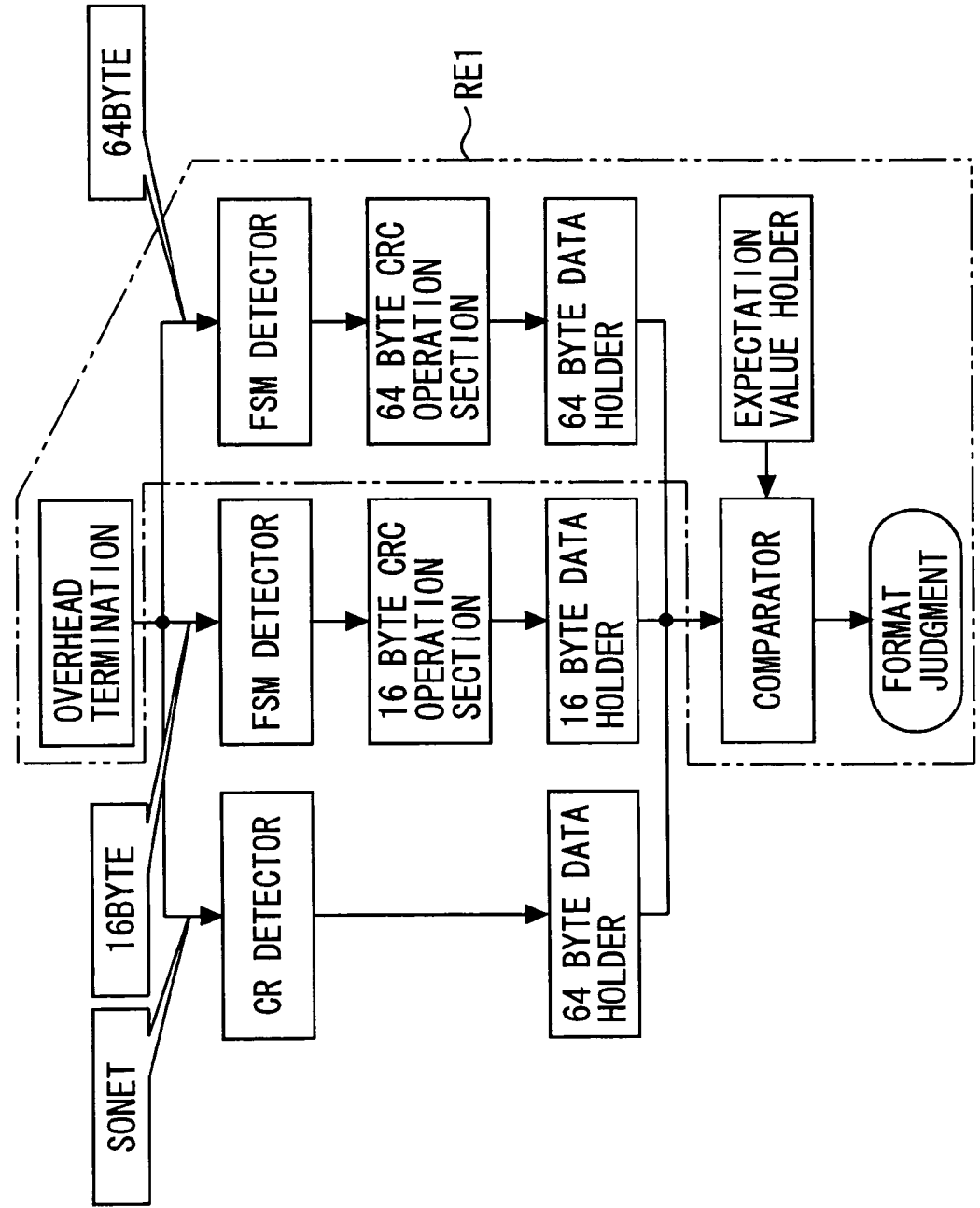
FIG. 5 shows a configuration example of an optical transmission apparatus when it is assumed to have a processing function for each format.

The optical transmission apparatus 10 employing the reception side components as mentioned above shares the frame start marker detector, the 16-byte/64-byte data holder, and the 16-byte range/64-byte range CRC operation section, as compared with the optical transmission apparatus of the improvement target shown in FIG. 5. Employing this shared configuration can reduce the apparatus scale.

In short, the frame start marker detector has the perfectly same function with regard to the 16-byte frame format and 64-byte frame format. Thus, only one frame start marker detector can be simply shared.

As for the 16-byte/64-byte data holder, the disagreement is the difference in the data size. Thus, since the 64-byte data holder is used also for the 16-byte data, the individual installation of the 16-byte data holder is not required.

As for the 16-byte range/64-byte range CRC operation section, the difference lies in the fact that the CRC-7 operation range is the 16 bytes or 64 bytes. Thus, by designing that the operation can be executed even in both of the operation ranges, the sharing is attained. Also, by judging whether the CRC-7 operation result agrees in the 16-byte range or agrees in the 64-byte range, it is possible to judge whether the path trace format is the 16-byte frame format or the 64-byte frame format. Thus, it is not required to provide the judgment function between the 16-byte frame format and the 64-byte frame format which is originally required because of the sharing of the components.

<Transmission Side Components of Optical Transmission Apparatus>

Also, the optical transmission apparatus 10 having the path trace function shown in FIG. 6 includes, as the transmission side components to the transmission path in the synchronous optical transmission network, a format setting section 21, a data setting section 22, a format generator 23, and an overhead generator 24, in addition to the controller 19 mutually connected through the internal bus 20.

In detail, the format setting section 21 as the transmission side component selects the path trace format for the transmission from a self-station to an opposite station in accordance with the result when the path trace format transmitted through the transmission path from the opposite station (strictly speaking, the optical transmission apparatus 10 in an opposite communication node) in the synchronous optical transmission network is automatically judged by the reception side components of the self-station (strictly speaking, the optical transmission apparatus 10 in a self communication node).

The data setting section 22 maps (adds) the path trace message of a transmission target set from a maintainer terminal 30 such as a personal computer, by the maintainer of the optical transmission apparatus 10 of the self-station, to the format selected by the format setting section 21.

The format generator 23 generates the path trace data (refer to FIG. 1, FIG. 3, and FIG. 4) in which the frame start marker and the CRC-7 operation result, or the CR code and the LF code are added to the format to which the path trace message is mapped by the data setting section 22.

The overhead generator 24 sends out the path trace data to the J1 byte. In short, the path trace data of the generated frame format is inserted into the J1 byte existing at the lead position of the path overhead of each VC-3, one byte at one time, by the overhead generator 24. After that, the path trace data is transmitted as an STM-1 frame from the communication node to the transmission path.

In the optical transmission apparatus 10 having the transmission side components, when a two-way transmission route which will be described later in detail is configured or when an intermediate path trace is performed, the opposite station or path trace reception station (relay station) can receive the path trace format. Thus, by transmitting the path trace format automatically judged on the self-station reception side to the opposite station or path trace reception station, the maintainer can carry out the path conductive state check without thinking about the kind of the path trace format.

Note that, as the result of detecting the path trace format by providing the protection stage number for carrying out detection plural times if the normal detection was impossible or in other cases, the maintainer can manually set the path trace format for the optical transmission apparatus 10 through the maintainer terminal 30.

<Application Example to Synchronous Optical Transmission Network of Optical Transmission Apparatus>

Figure 7:
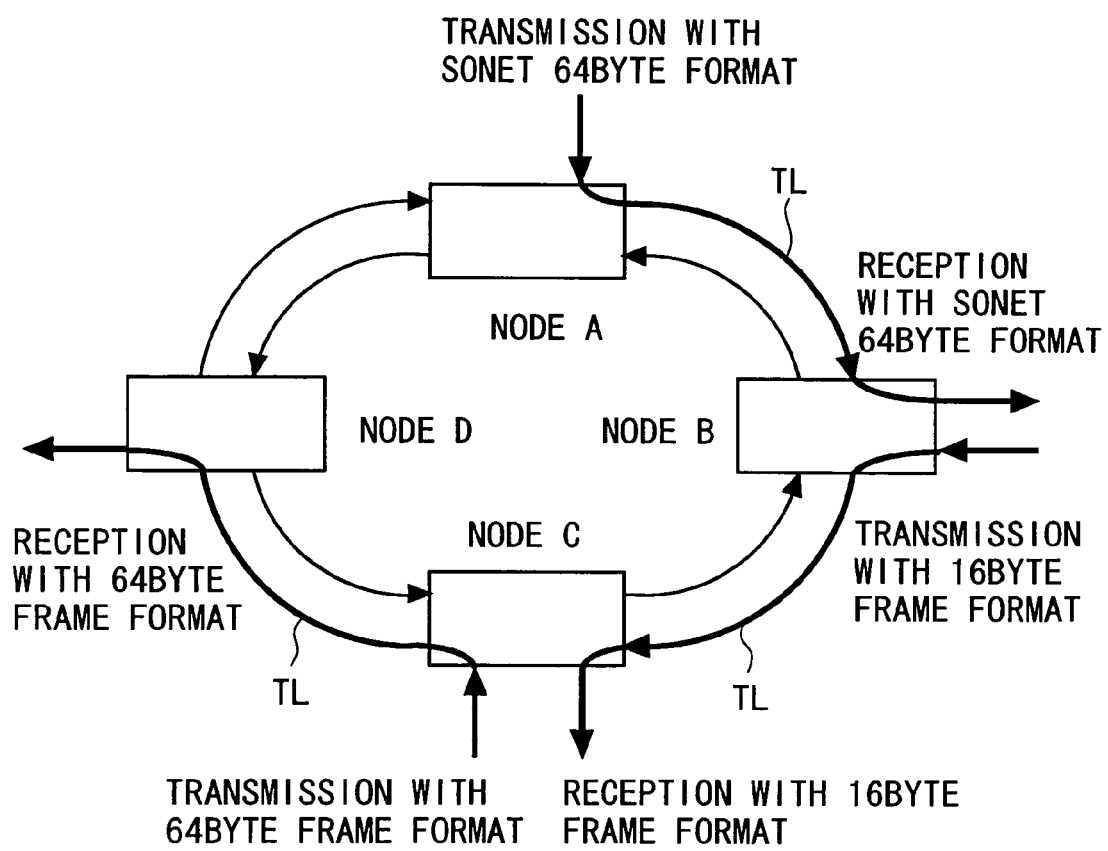
FIG. 7 shows a configuration example of a ring type synchronous optical transmission network when various formats are used.

FIG. 7 shows an example in which in a ring type synchronous optical transmission network where four communication nodes A, B, C, and D each having the optical transmission apparatus 10 and maintainer terminal 30 shown in FIG. 6 are connected in the shape of a ring through a transmission path (an optical fiber transmission path) TL, the various path trace formats are used to transmit and receive the path trace message included in the path trace data.

In this ring type synchronous optical transmission network, the transmission of the path trace message is carried out by using the SONET 64-byte format (refer to FIG. 1) from a communication node (this may be merely referred to as a node) A to a node B, using the 16-byte frame format (refer to FIG. 3) from the node B to a node C, and using the 64-byte frame format (refer to FIG. 4) from the node C to a node D. However, strictly speaking, the path trace message is transmitted to the transmission path TL in the state multiplexed to the STM-1 frame.

The reception side of the path trace message in the nodes A to D automatically determines the path trace format and extracts the path trace message. Thus, the conductive state check of the path (the logical route in the transmission path TL) that is the original function of the path trace can be executed irrespectively of the kind of the path trace format. That is, in the ring type synchronous optical transmission network where the optical transmission apparatuses 10 having the functions are placed at the nodes A to D, the plurality of path trace formats can be used to carry out the transmission and reception of the path trace message.

This ring type synchronous optical transmission network can configure a main network. Also, the nodes A to D further include a line terminate equipment (LTE) having optical/electric conversion and electric/optical conversion functions and a multiplex and multiplex separation function, and are connected to an access-based network including a switch.

<Linkage between Optical Transmission Apparatus and Maintainer Terminal>

In the optical transmission apparatus 10 shown in FIG. 6, at a time of a path trace format reception, for example, as a result when the protection stage number function section 16 detects the path trace format at a protection stage number five stage, if the path trace format cannot be normally detected, the controller 19 judges that the normal path trace format is not transmitted from the transmission side (the opposite station) and reports a path trace format detection rejection through the maintainer terminal 30 to the maintainer of the optical transmission apparatus 10 on the reception side (the self-station). Thus, the maintainer can grasp the path trace processing situation.

Also, in the optical transmission apparatus 10, the path trace format to be transmitted to the opposite station or path trace reception station (relay station) is automatically selected, the controller 19 grasps the maximum allowable character number of the path trace message that can be transmitted under the selected format. Then, the controller 19, when the maintainer sets the path trace message of the transmission target in the maintainer terminal 30, checks that the path trace message does not exceeds the maximum allowable character number. The controller 19, if detecting that the path trace message exceeds the maximum allowable character number, reports its fact through the maintainer terminal 30 to the maintainer together with the maximum allowable character number of the automatically selected path trace format. Hence, the transmission of the path trace message exceeding the maximum allowable character number can be protected.

Moreover, the SS bit defined at a fifth bit and a sixth bit of an H1 byte on a fourth row (AU pointer) in a section overhead (SOH) of the STM-1 frame is set to "00" in the SONET and "01" in the SDH. Thus, the controller 19 of the optical transmission apparatus 10 collects information of the SS bit of the H1 byte from a line termination equipment (LTE) of the self-station, and judges whether it is a SONET signal or SDH signal. Then, the controller 19 provides the information together with the judgment result of the reception path trace format through the maintainer terminal 30 to the maintainer. Thus, the maintainer can grasp whether the path trace format used in the self-station is that from the SONET signal or that from the SDH signal.

[Operation of Optical Transmission Apparatus Having Path Trace Function]

The specific operation example of the optical transmission apparatus according to the embodiment of the present invention will be described below with reference to FIG. 6, FIG. 8, and FIG. 9. By the way, in this operation explanation, when the limit is not especially required, the communication node and the optical transmission apparatus placed in that communication node are not discriminated.

Figure 8:
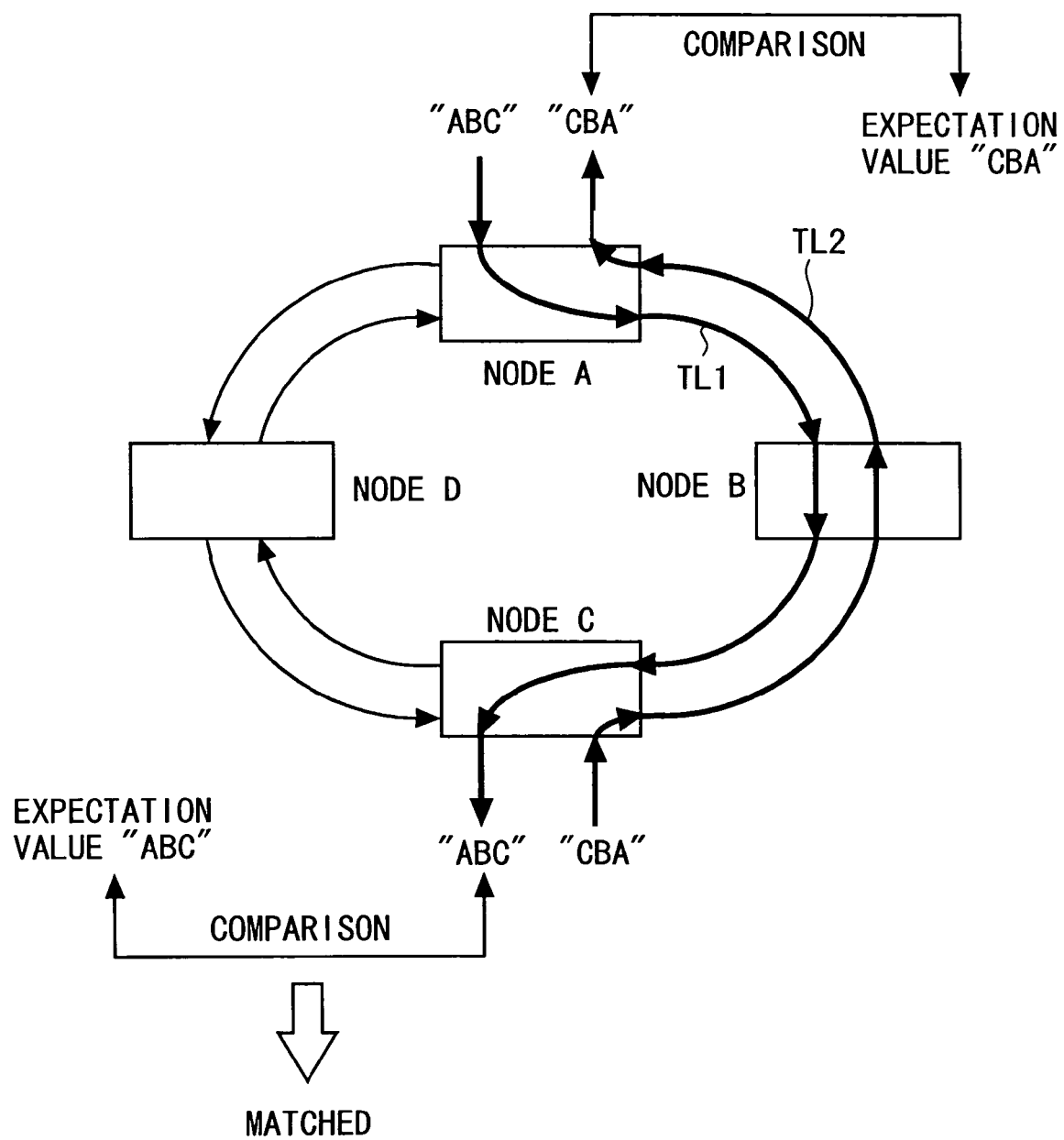
FIG. 8 is a diagram for explaining an operation of the optical transmission apparatus according to the embodiment of the present invention.

Here, in the ring type synchronous optical transmission network shown in FIG. 8, a communication node A can transmit and receive the path trace format of the 64-byte frame format. However, the optical transmission apparatus 10 having the path trace function is not placed. Also, in a communication node C, the optical transmission apparatus 10 having the path trace function is placed. As the path trace message, "ABC" is transmitted to the communication node C from the communication node A, and "CBA" is transmitted to the communication node A from the communication node C, respectively.

The maintainer of the node A sets the path trace message "ABC" for the path toward the node C through the maintainer terminal. Since the node A employs the 64-byte frame format for the path trace message transfer, the path trace message is inserted into the ASCII character code section from the second byte to the 64-th byte of the 64-byte frame format, and the CRC-7 operation result of the previous frame together with the frame start marker is inserted into the header byte of the first byte, and the path trace format is generated. The path trace format generated at the node A is as shown in FIG. 9.

The path trace data of the generated path trace format is inserted into the J1 byte existing at the lead position of the path overhead of each VC-3, one byte at one time, and transmitted as the STM-1 frame from the node A through a transmission path TL1 toward the node C.

The path trace data of the path trace format transmitted to the node C is terminated at the overhead termination 11 in the optical transmission apparatus 10 of the node C and extracted from the J1 byte of the path overhead, one byte at one time. Whether the CR code or frame start marker exists in the extracted path trace data is detected by the CR detector 12 or frame start marker detector 13. Here, since the 64-byte frame format is employed for the path trace, the frame start marker is detected by the frame start marker detector 13.

Next, the CRC operation section 14 carries out the CRC-7 operation of the path trace data and judges whether the result obtained through the operation at the 16-byte agrees or the result obtained through the operation at the 64-byte agrees. Here, since the 64-byte frame format is employed, the result operated at the 64-byte agrees. Thus, the CRC operation section 14 determines the reception of the path trace data of the 64-byte frame format and reports its fact to the controller 19.

The data holder 15 captures and holds the path trace data sent out from the CRC operation section 14. At this time, the data holder 15 captures and holds the path trace data corresponding to the 64 bytes from the first byte where the frame start marker is detected.

If the protection stage number function section 16 is placed in order to avoid the fluctuation in the detection result, the protection stage number function section 16, when the path trace format is received, for example, if at the reception of continuous two times, the format can be normally detected in both of them, judges that the format is normally received.

If the protection stage number function section 16 judges the normal format reception, the comparator 17 extracts the path trace message (the ASCII character code) from the path trace data held in the data holder 15 through the protection stage number function section 16. In the 64-byte frame format, the portion from the second byte to the 64-th byte is the area in which the path trace message is stored. Thus, the comparator 17 extracts the path trace message from a position corresponding to this.

The expectation value holder 18 holds the path trace message to be received, which is preset through the maintainer terminal 30 by the maintainer of the node C, on the basis of the instruction of the controller 19. The comparator 17 compares the path trace message held in the expectation value holder 18 and the path trace message extracted from the data holder 15. As a result of this comparison, if the path trace messages agree, this implies that the path to the node C from the path A can be normally established.

Also, the kind of the path trace format received by the node C and the content of the SS bit are reported from the controller 19 to the maintainer terminal 30. Thus, the maintainer can know the kind (line type) of the path trace format.

On the other hand, if the path trace message is transmitted to the node A from the node C, the maintainer of the node C sets the path trace message "CBA" for the path to the node A through the maintainer terminal 30. The node C which has already received the path trace message "ABC" from the node A automatically determines the fact that the node A transmits the path trace message in the 64-byte frame format, through the reception side components.

Thus, the format setting section 21 as the transmission side component in the node C defines the path trace message "CBA" set through the maintainer terminal 30 by the maintainer of the node C as the frame format to be transmitted to the node A, and automatically selects the 64-byte frame format.

Next, the data setting section 22 inserts the path trace message into the ASCII character code section from the second byte to the 64-th byte of the 64-byte frame format. Also, the format generator 23 inserts the CRC-7 operation result of the previous frame together with the frame start marker into the header byte of the first byte and generates the path trace format.

The path trace data of the generated 64-byte frame format is inserted into the J1 byte existing at the lead position of the path overhead of each VC-3, one byte at one time, by the overhead generator 24, and transmitted as the STM-1 frame from the node C through a transmission path TL2 to the node A.

The node A in which the optical transmission apparatus having a reception side component RE1 shown in FIG. 5 is placed receives the path trace data of the 64-byte frame format transmitted from the node C through the overhead extractor, the frame start marker detector, and the CRC operation section, and holds the path trace data in the data holder. The comparator compares the path trace message to be received, which is held in the expectation value holder and preset by the maintainer of the node A, with the received path trace message, and can check that the path to the node A from the node C is normally established if the comparison results agree.

The two-way transmission route configuration and the intermediate path trace will be described below in detail with reference to FIG. 8, FIG. 10, and FIG. 11.

Herein, in the ring type synchronous optical transmission network as shown in FIG. 8, the configuration in which the signal (the path trace data) is transmitted and received in two ways between the node A and the node C is referred to as the two-way transmission route configuration (2 Way Configuration). Specifically, this implies the configuration in which the signal transmission, from the node in which the overhead (SOH, POH) is generated to the node in which the overhead is terminated, is executed in the two ways (in short, from the node A to the node C and from the node C to the node A).

In the path trace, the overhead terminates in the apparatus at which the path overhead originally terminates, and the path trace data is extracted. For example, in the ring type synchronous optical transmission network shown in FIG. 8, with regard to the transmission of the path trace data to the node C from the node A, the path overhead terminates at the node C. Also, the node B is the node on the transmission route. The path overhead does not terminate.

The intermediate path trace is the method which extracts and monitors the path trace data located at the path overhead in the node where the path trace data does not originally terminate, and inserts the path trace data from the node where the path overhead is not generated, and consequently checks that the path setting is normally performed. In the ring type synchronous optical transmission network shown in FIG. 8, the intermediate path trace is executed in the node B.

Figure 10:
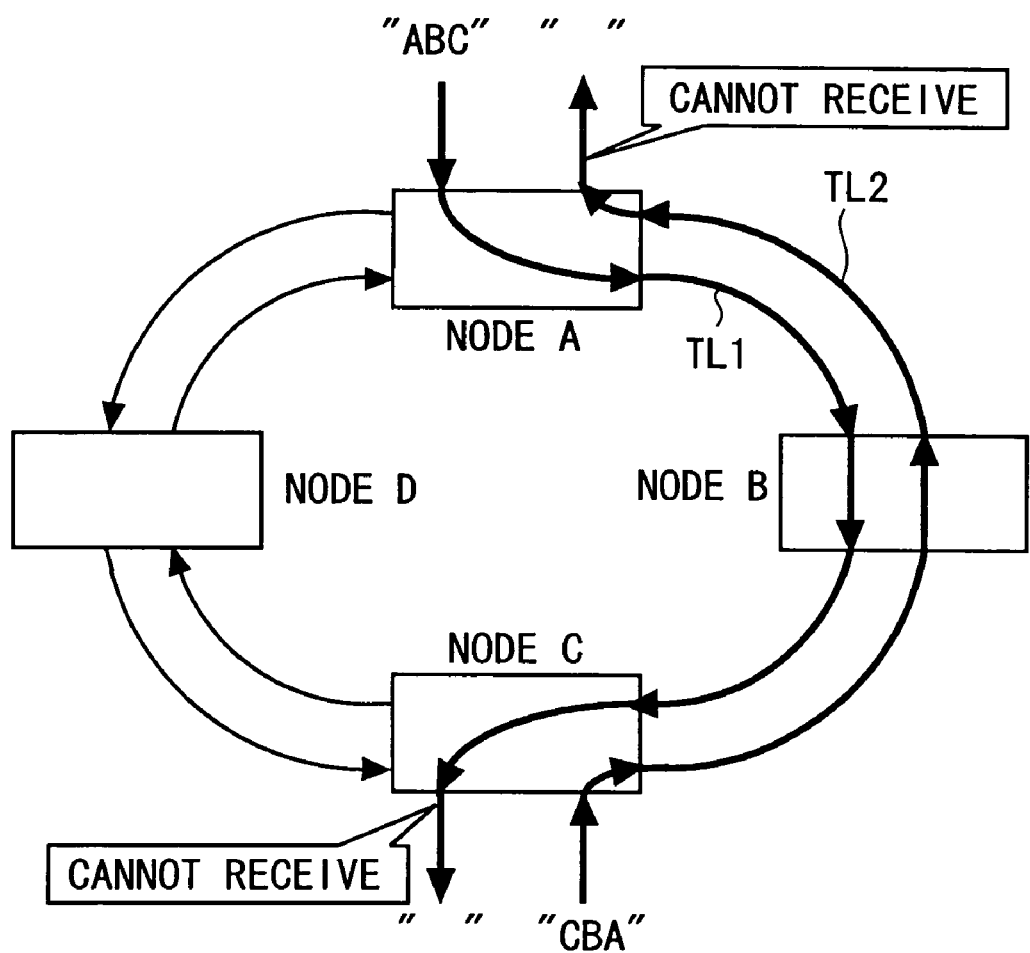
FIG. 10 is a diagram for explaining the operation of the optical transmission apparatus according to the embodiment of the present invention.
Figure 11:
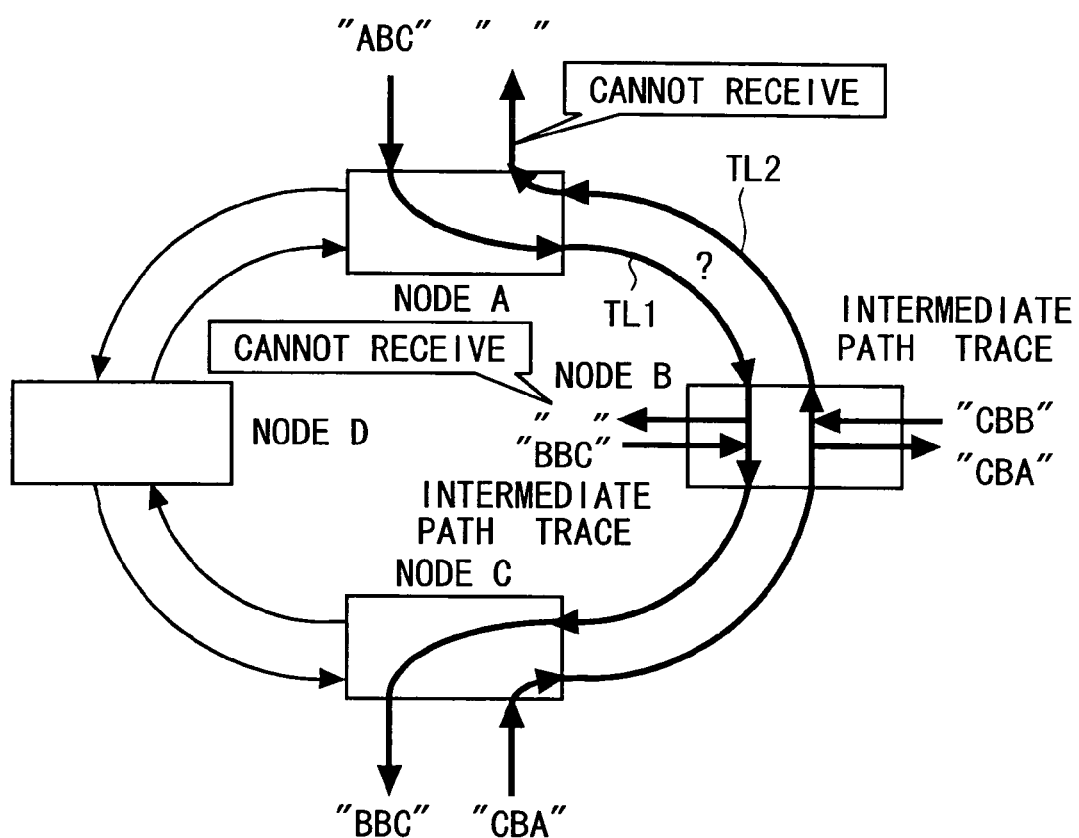
FIG. 11 is a diagram for explaining the operation of the optical transmission apparatus according to the embodiment of the present invention.

For example, as shown in FIG. 10, it is assumed that although the two-way transmission routes TL1 and TL2 are configured between the node A and the node C in the ring type synchronous optical transmission network, it is impossible to receive the path trace data in a satisfactory manner. In order to cut and separate a trouble point, as shown in FIG. 11, an intermediate path trace function is used in the node B.

When the path trace data transmitted from the node A is received in the node B, if the path trace message "ABC" can be received, there is no problem. However, if the expected path trace message cannot be received such as a case that nothing can be received, a fact that any problem occurs in the path between the node A and the node B is cut and separated. In the example shown in FIG. 11, the normal reception cannot be executed, which implies the fact that any problem occurs in the path between the node A and the node B.

Also, when a path trace message "BBC" is transmitted to the path to the node C from the node B, if this message "BBC" can be received in the node C, a fact that there is no problem in the path between the node B and the node C is cut and separated. In the example shown in FIG. 11, since the normal reception is performed, the fact that there is no problem in the path between the node B and the node C is cut and separated.

Similarly, with regard to the paths from the node C to the node B and from the node B to the node A, if the intermediate path trace function is used in the node B, a fact that a problem occurs in the path from the node B to the node A can be cut and separated.

In the ring type synchronous optical transmission network as exemplified here, only one node exists between the node A and the node C. However, if many nodes exist in the two-way transmission route between the node A and the node C, this intermediate path trace function is effective for the cut and separation of the trouble point.

[Effect]

According to the optical transmission apparatus having the path trace function, it is possible to automatically judge which of the path trace formats of the SONET 64-byte format, the 16-byte frame format, and the 64-byte frame format is used to carry out the transmission/reception.

Also, according to this optical transmission apparatus, the apparatus (circuit) scale can be reduced by employing the configuration that can detect any path trace format of the SONET 64-byte format, the 16-byte frame format, and the 64-byte frame format and by sharing, in the configuration, the data holder for holding the path trace data, the frame start marker detector, and the CRC operation section.

Also, according to this optical transmission apparatus, in the synchronous optical transmission network, even if the path trace formats different from each other are used in the respective nodes, the formats can be automatically judged on the reception side, and the transmission/reception of the path trace data can be performed.

Also, according to this optical transmission apparatus, since the protection stage number is provided to carry out the determination of the path trace format and the agreement/disagreement judgment of the path trace message, the determination and the judgment can be performed after the transmission/reception of the path trace data becomes stable.

Also, according to this optical transmission apparatus, as the result of the detection of the path trace format, if the path trace format cannot be detected because the format is not normally transmitted and received, the format detection impossibility state can be reported to the maintainer.

Also, according to this optical transmission apparatus, at the time of the two-way transmission route configuration or intermediate path trace execution, the path trace format from the opposite station is assumed to be the format that can be received in the opposite station, and the path trace format determined on the reception side is employed, and the path trace data can be automatically transmitted to the opposite station or path trace reception station (the relay station).

Also, although the path trace format transmitted to the opposite station or path trace reception station is automatically selected to transmit the path trace message, the character limit number of the path trace message may be 15 bytes, 62 bytes, or 63 bytes, depending on the selected format. According to this optical transmission apparatus, when the maintainer sets the path trace message for the automatically selected path trace format, if the path trace message exceeds the message character number allowed in the format, its fact is reported to the maintainer together with the transmittable maximum character number.

Moreover, in the conventional optical transmission apparatus for North America, the signal based on SONET is used as the preamble. As noted in ANSI T1.269-2000, there is an action to make SONET/SDH common in future. By supporting the ANSI T1.269-2000, the path trace data is transmitted in the 16-byte frame format and the 64-byte frame format from the SONET-based optical transmission apparatus. Thus, in accordance with the determination result of the path trace format and the information of the SS bit in the H1 byte of the SONET/SDH frame, a SONET/SDH mode and the kind of the path trace format can be provided to the maintainer.

INDUSTRIAL APPLICABILITY

According to the present invention, the optical transmission apparatus having the path trace function that can support the path trace format of the new standard, together with the path trace format of the existing standard can be provided.

Also, according to the present invention, the optical transmission apparatus that can attain the reduction in the apparatus (circuit) scale by sharing the components can be provided. Thus, this greatly contributes to the scale reduction in the optical transmission apparatus, the lower electric power consumption, and the drop in the cost.

Also, according to the present invention, the optical transmission apparatus can be provided in which the conductive state check of the path can be carried out in accordance with the agreement/disagreement of the original path trace message without any setting with regard to the path trace format by the maintainer.

Moreover, according to this embodiment, the optical transmission apparatus can be provided in which the setting of the protection stage number enables the determination of the path trace format and the agreement/disagreement judgment of the path trace message to be carried out after the stable transmission/reception of the path trace data becomes possible.

Also, according to the present invention, this becomes one help to make the SONET/SDH common in future.

[Others]

The disclosures of international application PCT/JP2003/000420, filed on Jan. 20, 2003 including the specification, drawings and abstract are incorporated herein by reference.

What is claimed is:

1. An optical transmission apparatus having a path trace function of carrying out a conductive state check of a path in a synchronous optical transmission network, comprising:
    a first judgment unit judging a path trace format of an existing standard corresponding to a SONET, in response to a detection of a first specific code contained in a path trace data;
    a second judgment unit judging a path trace format of a new standard corresponding to an SDH, in response to a detection of a second specific code contained in the path trace data;
    a third judgment unit specifying one of the path trace formats of a plurality of the new standards, in accordance with a content of a third specific code which is contained together with the second specific code in the path trace data; and
    a unit reporting a judgment result of the path trace format, and a SONET/SDH mode based on a value of an SS bit being defined at a fifth bit and a sixth bit within an H1 byte of a SONET/SDH frame, to a maintainer terminal.

2. The optical transmission apparatus according to claim 1, wherein when the first judgment unit does not detect the first specific code, the second judgment unit detects the second specific code; and
    when the second judgment unit detects the second specific code, the third judgment unit detects the third specific code.

3. The optical transmission apparatus according to claim 1, wherein the first specific code is a carriage return code;
    the second specific code is a frame start marker; and
    the third specific code comprises an operation result of a circulation redundancy inspection of the path trace data corresponding to 16 bytes or 64 bytes of a previous frame.

4. The optical transmission apparatus according to claim 3, wherein the path trace data in the path trace format of the existing standard has a 64-byte configuration of a path trace message represented by a printable or displayable ASCII character code corresponding to 62 bytes, the carriage return code corresponding to one byte, and a line feed code corresponding to one byte, and
    the path trace data in the path trace format of the new standard has a 16-byte configuration of a header byte corresponding to one byte including the second specific code and the third specific code and a path trace message represented by a printable or displayable ASCII character code corresponding to 15 bytes, or a 64-byte configuration of a header byte corresponding to one byte including the second specific code and the third specific code and a path trace message represented by a printable or displayable ASCII character code corresponding to 63 bytes.

5. The optical transmission apparatus according to claim 1, further comprising:
    a holding unit that can hold the path trace data of the path trace format of the existing standard and the path trace format of the new standard.

6. The optical transmission apparatus according to claim 5, wherein the second judgment unit and the holding unit are shared to process the path trace data of the path trace format of the existing standard and the path trace format of the new standard.

7. The optical transmission apparatus according to claim 6, wherein the third judgment unit is shared to process the path trace data of the path trace format of the existing standard and the path trace format of the new standard.

8. The optical transmission apparatus according to claim 1, further comprising:
    a protection stage number function unit judging a normal reception of the path trace format on the basis of detection results of a plurality of times.

9. The optical transmission apparatus according to claim 8, further comprising:
    a comparing unit comparing a path trace message received from the protection stage number function unit and a path trace message that is preset from a maintainer terminal and held as an expectation value.

10. The optical transmission apparatus according to claim 1, further comprising:

a unit, when a detection impossible state of the path trace format occurs, notifying a maintainer terminal of the occurrence of the detection impossible state.

11. An optical transmission apparatus having a path trace function of carrying out a conductive state check of a path in a synchronous optical transmission network, comprising:

a first judgment unit judging a path trace format of an existing standard corresponding to a SONET, in response to a detection of a first specific code contained in a path trace data;

a second judgment unit judging a path trace format of a new standard corresponding to an SDH, in response to a detection of a second specific code contained in the path trace data;

a third judgment unit specifying one of the path trace formats of a plurality of the new standards, in accordance with a content of a third specific code which is contained together with the second specific code in the path trace data;

a unit, in accordance with a result of automatic determination of the path trace format from an opposite station at a time of a two-way transmission route configuration or intermediate path trace execution as the path, automatically selecting the path trace format that can be received and transmitting the path trace data to the opposite station at the time of the two-way transmission route configuration or to a path trace receeotion station existing at an intermediate position at the time of the intermediate path trace execution; and a unit, when a character number of a path trace message of a transmission target set from a maintainer terminal exceeds a character number processed in the path trace format, notifying the maintainer terminal of a character number excess state and a transmittable maximum character number.

* * * * *